(No Model.)

J. H. ANDRE.
GARDEN HOE.

No. 522,872. Patented July 10, 1894.

WITNESSES
Geo. M. Anderson
Philip C. Masi

INVENTOR
Jno. H. Andre
by E. W. Anderson
Attorney

UNITED STATES PATENT OFFICE.

JOHN H. ANDRE, OF LOCKWOOD, NEW YORK.

GARDEN-HOE.

SPECIFICATION forming part of Letters Patent No. 522,872, dated July 10, 1894.

Application filed December 30, 1893. Serial No. 495,218. (No model.)

*To all whom it may concern:*

Be it known that I, JOHN H. ANDRE, a citizen of the United States, and a resident of Lockwood, in the county of Tioga and State of New York, have invented certain new and useful Improvements in Garden-Hoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
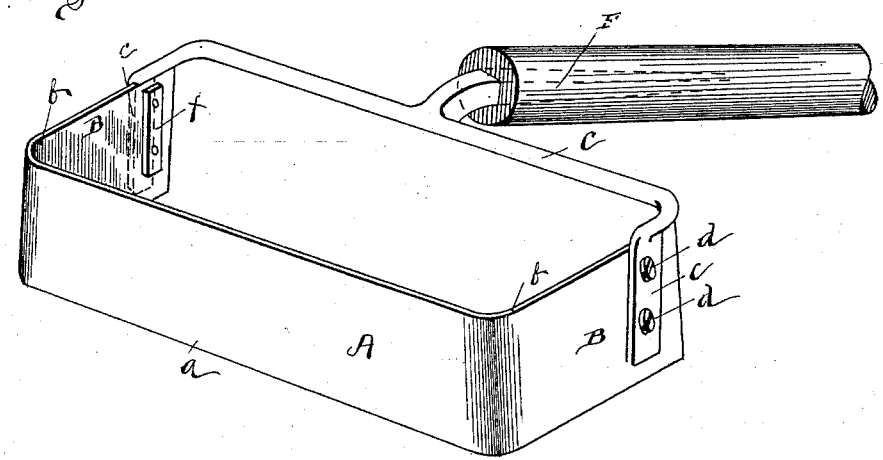
Figure 2:
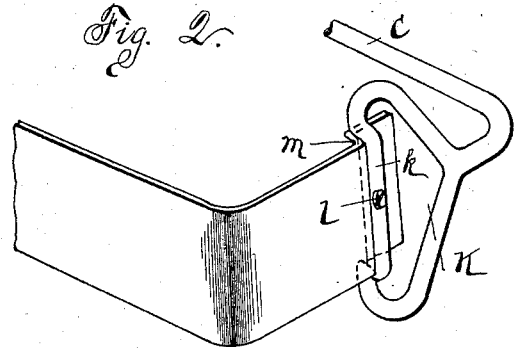
Figure 3:
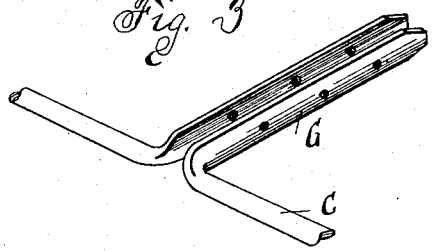

Figure 1 of the drawings is a perspective view of the hoe. Fig. 2 is an end view of modification in perspective and Fig. 3 is a detail view.

This invention has relation to certain new and useful improvements in garden hoes, and is designed to provide a practical and convenient implement of simple construction and improved character for use in the cultivation of small plants, and those which are grown in close rows or drills, as well as for other like purposes; and the invention consists in the novel construction and combination of parts, all as hereinafter described and pointed out in the appended claims.

Referring to the accompanying drawings illustrating the invention, the letter A designates the blade of the implement, which consists of a thin, narrow plate of sheet metal, ground to form a cutting edge $a$, the end portions of said plate being bent upwardly at substantially right-angles as at B, B, the cutting edge being continuous along the forward edge of the blade and up these bent portions.

At the points where the bends are made a twist is given the plate as indicated at $b$, $b$, giving the horizontal portion of the blade a greater length along its forward or cutting edge, than at its rear edge. The effect of this is as follows:—As the blade is drawn through the ground, the soil in passing over it is diverted toward the center, and away from the drills, thus preventing the covering up of small plants, and leaving the soil in a condition to facilitate subsequent hand-weeding.

C designates the frame or bow whose ends $c$, $c$, are bent horizontally at substantially right-angles to the main horizontal portion of the frame, and are secured to the respective arms B, B, of the blade, transversely thereof, each by two short screw-bolts $d$, $d$, which engage perforations in the said arms and are secured by a nut $f$ on the inner face. By bending the ends of the bows as described and securing them transversely to the arms B, B, instead of vertically, as customary, said ends, as well as the securing nuts are removed from offering an obstruction to the passage of the implement through the ground in deep work. I also prefer to make the nuts for both bolts $d$, $d$, in one piece, as this prevents their turning, and also permits the screw bolts to be removed by the application of a screwdriver, and without the aid of a wrench.

To work well, the blades should be very thin and narrow, and if much used they will soon wear out, which in the old forms wherein they were riveted to the bows, necessitated the throwing away of the entire tool. By making the blade removable, as above described, when worn out, it may be readily replaced by a new one, thus preserving the handle and bows.

The inner ends of the bows may be welded together to form a tang or shank F, as in Fig. 1, or they may be provided with socket-strap extensions G, as in Fig. 3.

In Fig. 2 I have shown a modification of the invention, wherein the ends of the bows are branched to form loops K which are offset as shown at $k$ to form a seat or rest for the upturned end portions of the blade to which they are secured by a screw bolt $l$. I prefer in this arrangement to also offset the said upturned end portions at $m$ so that their outer surfaces may be flush with the outer face of the bows, the offsets forming shoulders for the bows to rest on. This feature may however be omitted.

Instead of making the branched portions K of the bows open they may be made solid.

I am aware that implements of the character herein described have been before known and used, and I do not claim the invention broadly, but, Having described my invention, what I believe to be new, and desire to secure by Letters Patent, is—

1. In an agricultural implement, the combination with a blade having its end portions bent at substantially right angles, of a bow or frame having arms parallel with the said blade, end arms parallel with the bent end portions of the blade, and attachment portions bent transversely of said end portions and detachably secured thereto, substantially as specified.

2. In an agricultural implement, the combination with a blade having its end portions bent at substantially right angles, and offset inwardly near their extremities to form transverse shoulder seats, of a bow or frame terminating in enlarged portions bent transversely of the said end portions and having outward offsets corresponding to the offsets of the said end portions, and means for detachably securing said frame or bow to the said end portions, substantially as specified.

In testimony whereof I affix my signature in presence of two witnesses.

JOHN H. ANDRE.

Witnesses:
THOMAS K. DIBBLE,
JAMES B. TAGER.